(12) United States Patent  (10) Patent No.:     US 7,243,334 B1
Berger et al.  (45) Date of Patent:     Jul. 10, 2007

(54) SYSTEM AND METHOD FOR GENERATING USER INTERFACE CODE

(75) Inventors: Kenneth A. Berger, Garland, TX (US); Larry J. Turner, Carrollton, TX (US); Andrew E. Wilcox, Dallas, TX (US)

(73) Assignee: Prelude Systems, Inc., Addison, TX (US)

( * ) Notice: Subject to any disclaimer, the term of this patent is extended or adjusted under 35 U.S.C. 154(b) by 756 days.

(21) Appl. No.: 10/046,389

(22) Filed: Jan. 16, 2002

(51) Int. Cl.
  *G06F 9/44* (2006.01)
  *G07F 19/00* (2006.01)
(52) U.S. Cl. ............ 717/109; 717/108; 717/110; 715/762; 705/30
(58) Field of Classification Search ........... 717/100, 717/106, 108, 109, 113
  See application file for complete search history.

(56) References Cited

U.S. PATENT DOCUMENTS

| | | | | |
|---|---|---|---|---|
| 5,237,691 | A | * | 8/1993 | Robinson et al. ........... 717/107 |
| 5,301,270 | A | * | 4/1994 | Steinberg et al. ........... 715/866 |
| 5,428,791 | A | * | 6/1995 | Andrew et al. ............. 717/121 |
| 5,448,740 | A | * | 9/1995 | Kiri et al. ................... 717/155 |
| 5,450,545 | A | * | 9/1995 | Martin et al. ............... 717/109 |
| 5,551,040 | A | * | 8/1996 | Blewett ...................... 717/106 |
| 5,594,642 | A | * | 1/1997 | Collins et al. .............. 715/535 |
| 5,754,858 | A | * | 5/1998 | Broman et al. ............. 717/111 |

(Continued)

OTHER PUBLICATIONS

Brad A. Myers, "User interface software tools", Mar. 1995, ACM Transactions on Computer-Human Interaction (TOCHI), vol. 2, Issue 1, pp. 64-103, ISSN:1073-0516.*

(Continued)

*Primary Examiner*—Tuan Dam
*Assistant Examiner*—J. Derek Rutten
(74) *Attorney, Agent, or Firm*—Jackson Walker L.L.P.; Christopher J. Rourk

(57) ABSTRACT

A system for generating user interface code is provided. The system includes a user interface class system generating a user interface class that has two or more user interface features that can be assembled into a user interface by an operator, such as field entry prompts and data display fields. The system also includes a handler class system generating one or more states for each user interface feature of the user interface class, such as to navigate through the field entry prompts and data display fields. The user interface class system, in conjunction with the handler class system, generates the user interface code that causes the selected user interface features and associated states for the user interface features to be generated.

20 Claims, 4 Drawing Sheets

U.S. PATENT DOCUMENTS

| | | | | |
|---|---|---|---|---|
| 5,786,815 | A | * | 7/1998 | Ford .......................... 715/744 |
| 5,911,070 | A | * | 6/1999 | Solton et al. ................ 717/105 |
| 5,950,001 | A | * | 9/1999 | Hamilton et al. ........... 717/107 |
| 5,966,532 | A | * | 10/1999 | McDonald et al. .......... 717/105 |
| 5,978,581 | A | * | 11/1999 | Sadiq et al. ................ 717/104 |
| 6,025,836 | A | * | 2/2000 | McBride ..................... 715/750 |
| 6,044,217 | A | * | 3/2000 | Brealey et al. ............. 717/107 |
| 6,066,181 | A | | 5/2000 | DeMaster |
| 6,113,649 | A | * | 9/2000 | Govindaraj ................. 717/113 |
| 6,115,690 | A | * | 9/2000 | Wong ............................ 705/7 |
| 6,118,939 | A | * | 9/2000 | Nack et al. ................. 717/109 |
| 6,131,183 | A | * | 10/2000 | Tyler .......................... 717/106 |
| 6,182,274 | B1 | * | 1/2001 | Lau ............................ 717/104 |
| 6,230,117 | B1 | | 5/2001 | Lymer et al. |
| 6,654,947 | B1 | | 11/2003 | North et al. |
| 6,760,902 | B1 | * | 7/2004 | Ott .............................. 717/113 |
| 6,763,515 | B1 | | 7/2004 | Vazquez et al. |
| 6,792,595 | B1 | * | 9/2004 | Storistenau et al. ........ 717/110 |
| 2001/0037490 | A1 | * | 11/2001 | Chiang .......................... 717/2 |
| 2002/0083413 | A1 | * | 6/2002 | Kodosky et al. ............ 717/109 |
| 2004/0205706 | A1 | * | 10/2004 | Portwood ................... 717/113 |

OTHER PUBLICATIONS

Carter et al. "Functional Test Case Identification in an Object-Oriented Environment using Matrix Progression Techniques", Jan. 1994, IBM Technical Disclosure Bulletin, vol. 37, No. 01, pp. 503-505.*

PCT Notification of Transmittal of the International Search Report or the Declaration, Dec. 10, 2004.

* cited by examiner

SYSTEM AND METHOD FOR GENERATING USER INTERFACE CODE

RELATED APPLICATIONS

This application is related to U.S. patent application Ser. No. 09/689,067, entitled "System and Method for Enterprise Resource Management," filed Oct. 12, 2000, and U.S. Pat. No. 6,553,406.

FIELD OF THE INVENTION

The present invention pertains to the field of software code generation. More specifically, the invention relates to a system and method for generating software code that generates a user interface when executed that allows a user to readily select the features and states of the user interface.

BACKGROUND OF THE INVENTION

Systems for generating computer code are known in the art. For example, it is known to use "components" in object oriented software programming for generating server-based software that generates graphic user interfaces, performs server-based functions for processing of data, or that performs other suitable functions. The impetus behind these systems has been to simplify the creation of computer code and to make such computer code easy to modify and update.

Nevertheless, many problems continue to be encountered with such computer code. One problem is that server-based generation of graphic user interfaces consumes a significant amount of server resources, which can result in slow processing of all server applications. Another problem is that an initial release of code must often be modified for user-specific applications, such as at the enterprise level, at site-specific locations, by developers for use with their clients, or in other manners. When such releases are then replaced by an updated version, any such modifications made must be implemented again, resulting in duplicated efforts or in the reluctance to use the new release because of the associated cost of making the modifications. Thus, systems for generating software have not resolved these and other problems.

SUMMARY OF THE INVENTION

In accordance with the present invention, a system and method for generating software are provided that overcome known problems with systems and methods for generating software.

In particular, a system and method for generating software are provided that use client-based graphic user interfaces to reduce server processing requirements for generating user interfaces, and that use a layered approach to accommodate the use of modifications to prior releases of code with new releases of code.

In accordance with an exemplary embodiment of the present invention, a system for generating user interface code is provided. The system generates a user interface class and a handler class. The user interface class includes two or more user interface features that can be assembled into a user interface by an operator, such as field entry prompts and data display fields. The handler class includes one or more states for each user interface feature of the user interface class, such as to navigate through the field entry prompts and data display fields.

The present invention provides many important technical advantages. One important technical advantage of the present invention is a system and method for generating and executing code that provides user interface code which operates on a local client, such that user interfaces do not need to be generated or solely executed by a server. In this manner, server loading for generation and execution of user interfaces is minimized, which allows the distribution of code execution functions and permits the server to be used for other data processing functions. In addition, the present invention provides for layered modification functionality, so that a code release can be modified in one or more layers and so that such layers will be compatible with new releases of the code.

Those skilled in the art will further appreciate the advantages and superior features of the invention together with other important aspects thereof on reading the detailed description that follows in conjunction with the drawings.

DETAILED DESCRIPTION OF THE INVENTION

Figure 1:
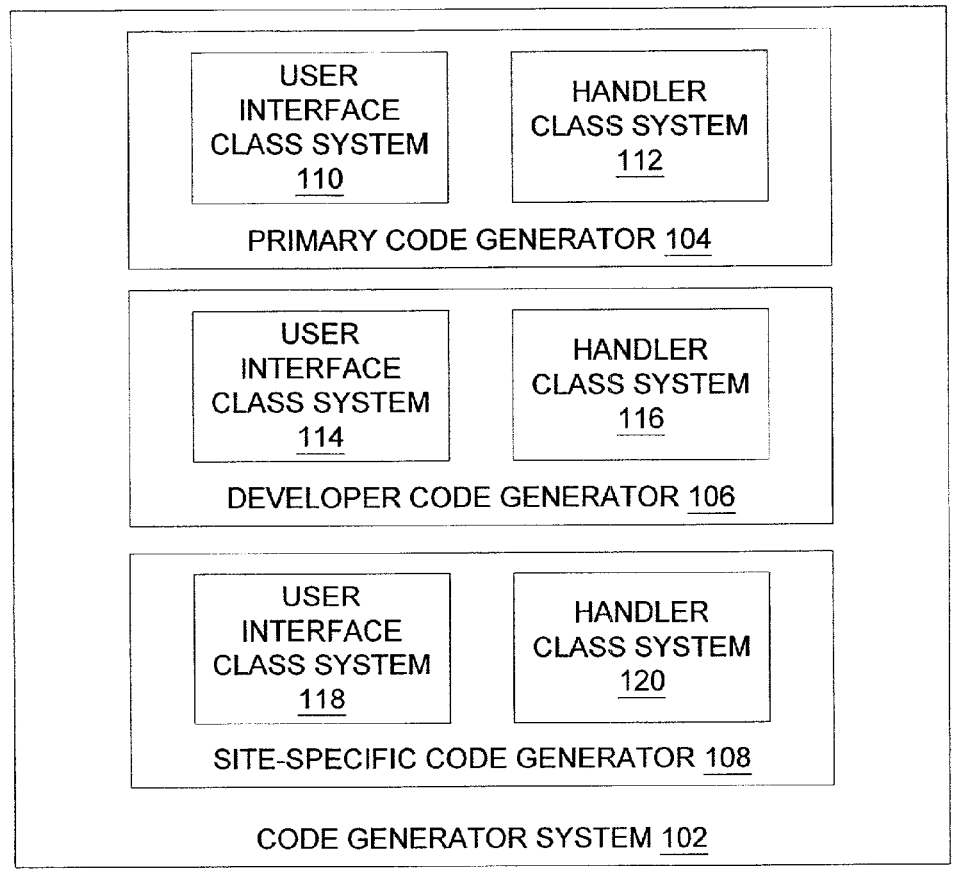
FIG. 1 is a diagram of a system for generating user interface code in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for generating user interface code in accordance with an exemplary embodiment of the present invention. System 100 allows primary software code packages for generating a user interface to be prepared by a user of the system, such as a program developer, by using predetermined user interface classes having predetermined states, and also provides a layered structure such that developers can modify code and can provide site-specific code modifications that will be compatible with future releases of primary code.

System 100 includes code generator system 102, which can be implemented in hardware, software, or a suitable combination of hardware and software, and which can be one or more software systems operating on a general-purpose server platform. As used herein, a software system can include one or more objects, agents, lines of code, threads, subroutines, databases, application programming interfaces (APIs), web browser plug-ins, or other suitable data structures, source code (human readable), object code (machine readable), and can include two or more different lines of code or suitable data structures operating in two or more separate software applications, on two or more different processing platforms, or in other suitable architectures. In one exemplary embodiment, a software system can include one or more lines of code or other suitable software structures operating in a general purpose software application, such as an operating system, and one or more lines of code or other suitable software structures operating in a specific purpose software application. In another exemplary embodiment, a software system can be implemented as a distributed software system, on a different processing platform than that shown in the exemplary embodiments herein, or in other suitable manners.

Code generator system 102 includes primary code generator 104, developer code generator 106, and site-specific code generator 108, each of which can be used in a centralized location or distributed as separate components to locations as needed. Primary code generator 104 includes one or more primary code generation modules, such as code generation modules that create software code that generates a user interface. In this regard, primary code generator 104 includes user interface class system 110 and handler class system 112. User interface class system 110 generates user interface class code. Handler class system 112 generates the handler class code. The user interface class code can include one or more user interface classes, such as data input classes, report generation classes, order processing classes, or other suitable classes for processing data. The classes of the user interface class code each have a corresponding set of available states in the handler class code. This corresponding set of states includes the progression states available for implementing the features of user interface class code. The features provided by user interface class system 110 and the states provided by handler class system 112 allow a user to select features and define states for a user interface, and then generate software code that implements the user interface.

In one exemplary embodiment, user interface class system 110 can generate a data entry class, such as a customer account data entry class. The customer account data entry class can include one or more data entry features that may be required to define a customer account, such as a customer name, customer address, customer account number, shipping address, contact name and address, and other suitable data. User interface class system 110 allows a user to select from available classes, such as the customer account entry class, and to view the available features, components and functions performed by the class. User interface class system 110 allows a user to determine the available options, how to access and utilize the options, and otherwise allows the user to design user interface screens for use in receiving data from a user and presenting data to the user.

Likewise, handler class system 112 allows the user to structure the states of the user interface screens in a suitable manner. In one exemplary embodiment, handler class system 112 is coupled to user interface class system 110 and can allow the user to select the state progression for a user interface. As used herein, the term "couple," and its cognate terms such as "couples" and "coupled," can include a physical connection (such as through a copper conductor), a virtual connection (such as through randomly assigned memory locations of a data memory device), a logical connection (such as through one or more logical devices of a semiconducting circuit), other suitable connections, or a suitable combination of such connections. In one exemplary embodiment, systems and components are coupled to other systems and components through intervening systems and components, such as through an operating system of a general purpose server platform.

Handler class system 112 can receive selections of features, components, options or functions that have previously been selected using user interface class system 110, and can prompt the user to indicate one or more states, and the corresponding features, components, options, or functions that should be activated at each state. For example, a user can first create an account setup screen using user interface class system 110 having an account name entry function, an account address entry function, and a contact name entry function. The user can then sequence the states of the account setup screen so that the account name entry function occurs in a first state, the account address entry function occurs in a second state, and the contact name entry function occurs in a third state. Likewise, associated function states, such as a lookup function for finding a state or business entity, can be provided through handler class system 112. In this manner, a user can define a sequence of states for a user interface screen that includes the performance of various functions, prompting for data fields, display of data fields, or other suitable states.

In another exemplary embodiment, user interface class system 110 and handler class system 112 can provide the components, options, and states required to interface with a server system, such as that disclosed in U.S. patent application Ser. No. 09/689,067, entitled "System and Method for Enterprise Resource Management," filed Oct. 12, 2000, which is hereby incorporated by reference for all purposes. In this exemplary embodiment, the interface system with the server will have predetermined data field and functions, such that the user interface code will have to provide an interface to these data fields and functions. The present invention thus provides a programming environment that allows user interface software to be generated, for modifications to that user interface to be readily made, and for new releases of the user interface code to be compatible with such modifications. In his manner, the need to modify the server software to provide additional user interface functionality is minimized, and the corresponding use of server resources to generate or execute user interfaces is also minimized.

Developer code generator 106 also includes a user interface class system 114 and handler class system 116, both of which interface with code generated by primary code generator 104. In one exemplary embodiment, primary code generator 104 generates code that allows a developer to generate additional code for modifying the code generated through primary code generator 104. Thus, a developer can use developer code generator 106 to modify user interface selections using user interface class system 114, and to modify states using handler class system 116.

In another exemplary embodiment, a developer can receive code for a software application that has been generated by primary code generator 104, and can determine that additional user interface features or states are required for the developer's application. The developer can then use developer code generator 106 to modify the code generated by primary code generator 104, such as by selecting additional user interface features through user interface class system 114 and by providing states for those new user interface features, by editing existing user interface features to modify the user interface features using user interface class system 114, or by using handler class system 116 to modify the existing states of an existing user interface feature or of a new user interface feature. In this manner, the developer can take an existing release of code from primary code generator 104, and can modify the code in a manner that allows user interface features and states to be customized for a business, a group of businesses, the developer's clientele, or other suitable purposes.

Furthermore, the code generated through developer code generator 106 is compatible with new code generated by primary code generator 104. In one exemplary embodiment, primary code generator 104 can be used to generate an accounts receivable system, such as one having cash receipts chargeback invoice user interface screens, cash receipts inquiry batch details user interface screens, cash receipts inquiry customer payment details interface screens, and other suitable accounts receivable features. Developer code generator 106 can receive the accounts receivable code generated by primary code generator 104, and can modify the code to provide additional user interface features such as to select additional access and utilization options, provide additional data entry or display states, or to otherwise modify the functionality of the code generated by primary code generator 104. Developer code generator 106 then generates developer code that supplements, interacts with, modifies, or overrides the code generated by primary code generator 104.

If additional user interface functionality, access utilization features, states, or other suitable modifications are made through primary code generator 104, the code generated through primary code generator 104 will interface with the code previously generated by developer code generator 106, regardless of any modifications made to existing user interfaces or states. In this manner, the code generated by developer code generator 106 will be compatible with the code generated by primary code generator 104 for new features or states.

For example, primary code generator 104 may generate code that creates an accounts receivable user interface screen having a customer entry field as the first state, and the developer code generator 106 can generate code that modifies the first state to request an account number instead of or in addition to the customer entry field. Subsequently, primary code generator 104 can generate a new release of code that provides a customer lookup function instead of a customer entry function as the first state. In this exemplary embodiment, the code generated by developer code generator 106 would replace the customer lookup function with the account number entry function previously generated, such that any modifications to code generated by primary code generator 104 in the new release will be compatible with code previously generated by developer code generator 106. Thus, in this exemplary embodiment, the new release of the primary code with the existing developer code would result in a first state that provides a customer lookup function, and a second state that requests an account number instead of or in addition to the customer entry field.

Likewise, site-specific code generator 108 allows a programmer to perform site-specific modifications to code that has been modified by developer code generator 106. In this manner, site-specific code generator 108 receives the code generated by primary code generator 104 and developer code generator 106, and allows a user to provide additional user interface features and states or modifications to current user interface features and states. Such site-specific code is backwards compatible with developer code and primary code in the manner previously described, such that any modifications to the code by a user of primary code generator 104 and developer code generator 106 will be compatible with code previously developed using site-specific code generator 108. Site-specific code generator 108 includes a user interface class system 118 and handler class system 120, both of which are capable of displaying the primary code and developer code user interfaces and states, and other available user interfaces and states, such that a user can provide different user interface and state functionality. In this manner, site-specific code modifications created for use with a first version of code generated by primary code generator 104 and developer code generator 106 will be compatible with a subsequent version of code generated by primary code generator 104 and developer code generator 106, without additional developer interaction.

In operation, system 100 allows users to develop code in a manner that allows new releases of code to be provided that are compatible with modifications made to earlier versions of code. The code generated by system 100 is user interface code, but system 100 can also be used with code that operates on a server, such as database access code, communications code, or other suitable server-based code. In this manner, user interface class systems 110, 114, and 118 could be replaced with other suitable systems, such as database access systems, and handler class systems 112, 116, and 120 could be replaced with other state engines, such as state engines based on database access functions.

Furthermore, the user interface code can be generated on a client for use in a client-server environment where the server software does not have to generate user interfaces. In this manner, server interface functionality can be defined in advance, and modifications to user interfaces can be made that do not require modification of server functionality, thus reducing the need for revising server software and also reducing the server processor resources required for interfacing with users.

Figure 2:
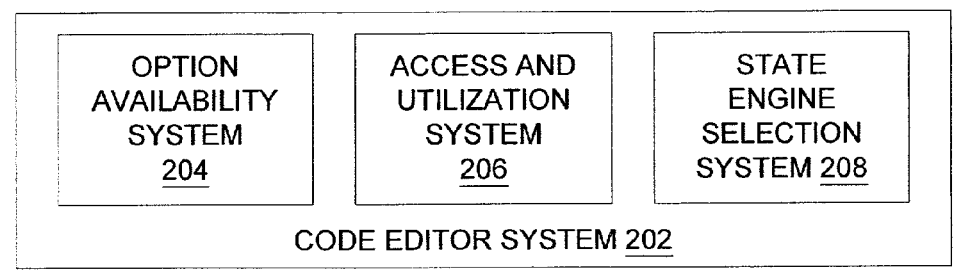
FIG. 2 is a diagram of a system for providing code editing functionality in accordance with an exemplary embodiment of the present invention.

FIG. 2 is a diagram of a system 200 for providing code editing functionality in accordance with an exemplary embodiment of the present invention. System 200 allows code to be edited at the primary code generator, developer code generator, site-specific code generator, or other suitable locations so as to provide backwards compatibility in a layered code generation architecture, such as for generation of user interface code.

System 200 includes code editor system 202, option availability system 204, access and utilization system 206, and state engine selection system 208, each of which can be implemented in hardware, software, or a suitable combination of hardware and software, and which can be one or more software systems operating on a general-purpose server platform. Code editor system 202 allows a user to review available feature classes and associated handler classes, and to assemble the feature classes and handler classes into a user interface or other suitable software systems. In one exemplary embodiment, code editor system 202 can be implemented with a development environment for software, such that a user can generate code, perform code testing, and release the code for use in a single environment.

Option availability system 204 provides detailed information on components or options that are available for each feature class. In one exemplary embodiment, option availability system 204 can use a set of classes called shadow objects that define how the components or options can be used. Coding standards for available option or component selections can be defined within the shadow object, such that the code generated by option availability system 204 adheres to a strict set of standards. In one exemplary embodiment, an object-oriented application can be provided where the definition of the objects that will be created is provided in a framework component, such that option availability system 204 can be used to produce multiple frameworks for use in different applications. Likewise, option availability system 204 can display the configuration of an existing release of code having one or more layers, and can allow the user to make changes to the existing release of code that will be compatible with new releases of code, such as by mapping the modifications made at each previous layer and interfacing any modifications made by the user at the present layer to the appropriate prior layer.

Access and utilization system 206 provides information on the way that code will be generated for accessing and utilizing components and options of a feature class. In this manner, coding standards can be defined such that the code generated by access and utilization system 206 adheres to a strict set of standards. In one exemplary embodiment, an object-oriented application can be provided where the code for accessing and utilizing the objects that will be created is provided in a framework component, such that access and utilization system 206 to be used to produce multiple frameworks for use in different applications. Access and utilization system 206 can also display the configuration of an existing release of code having one or more layers, and can allow the user to make changes to the existing release of code that will be compatible with new releases of code, such as by mapping the modifications made at each previous layer and interfacing any modifications added by the user at the present layer to the appropriate prior layer.

State engine selection system 208 allows a user to sequence states for feature classes. In one exemplary embodiment, the components or options that are available or that have been selected for a feature class can be displayed in a graphic user interface, and the components or options that are to be activated for a particular state can be selected by the user. State selection engine 208 then generates the code that is needed to implement the state changes. State engine selection system 208 can also display the state configuration of an existing release of code having one or more layers, and can allow the user to make changes to the states of the existing release of code that will be compatible with new releases of code, such as by mapping the modifications made at each previous layer and interfacing any modifications added by the user at the present layer to the appropriate prior layer.

In operation, system 200 allows an operator to generate code at the primary code generator 104 stage, such as to create a software package for performing predetermined functions, such as accounts payable, accounts receivable, general ledger, or other suitable functions. System 200 can also be implemented at a developer stage, a site-specific stage, or in other suitable layers, such as when an enterprise is customizing the software code for use at the enterprise level, or when a consultant is configuring the code for use in its consulting practice, or in other suitable configurations. In this manner, system 200 allows components, options, and states of feature classes to be selected and modified so as to allow a user to configure software in a suitable manner, but does not prevent the user from further modifying the software to accommodate specific needs of sites or enterprises or other suitable entities. Likewise, system 200 allows backwards-compatible changes to be made, so that any lower layers of code modifications to a release of code will be compatible with subsequent releases of the code.

Figure 3:
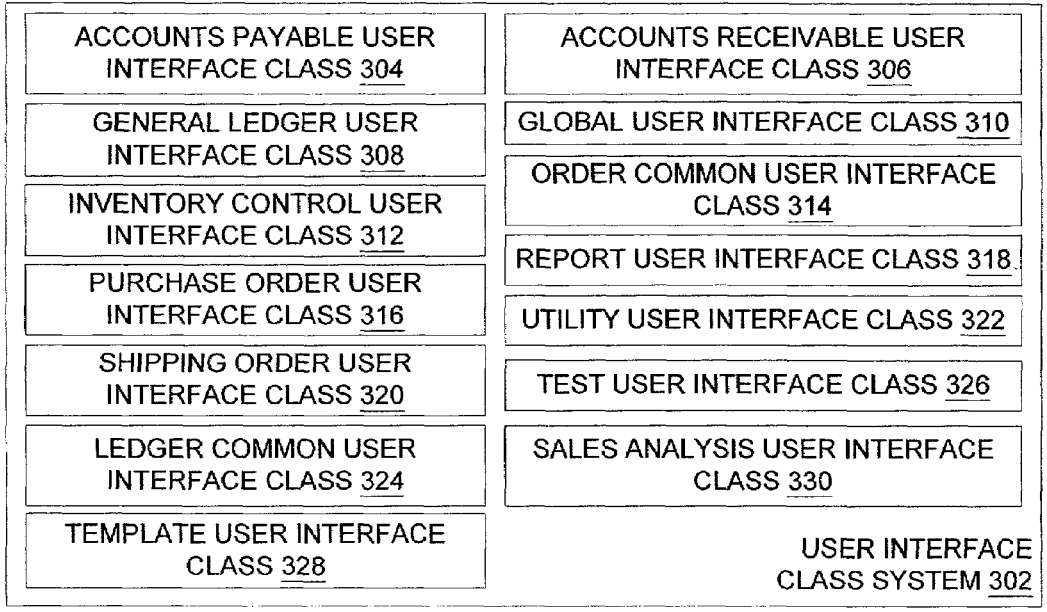
FIG. 3 is a diagram of a system for providing user interface classes in accordance with an exemplary embodiment of the present invention.

FIG. 3 is a diagram of a system 300 for providing user interface classes in accordance with an exemplary embodiment of the present invention. System 300 includes user interface class system 302 and 14 exemplary classes that will be defined in greater detail herein.

User interface class system 302 provides predetermined user interface classes, where each class further comprises options and components that can be adjusted or selected by a user. In one exemplary embodiment, system 200 can be used to assemble a user interface for a program in conjunction with user interface class system 302. Additional classes can be added to user interface class system 302, such that the new classes will be backwards-compatible with any code generated at lower levels, such as at the developer code generator 106 level or site-specific code generator 108 level of system 100.

Accounts payable user interface class 304 includes one or more classes for generating accounts payable user interfaces. In one exemplary embodiment, the following accounts payable user interface classes can be provided with accounts payable user interface class 304:

Accounts Payable Check Inquiry
Accounts Payable Check Number Lookup
Accounts Payable Check Run
General Ledger Distribution Line Item Subpanel
General Ledger Distribution Subpanel
Invoice Number Lookup
Manual Check Entry
Manual Invoice Batch Subpanel
Manual Invoice Subpanel
Manual Vendor Invoice Entry
Multiple Receiver Number Subpanel
Payment Selection And Processing
Single Receiver Number Subpanel
Variance Recost Subpanel
Vendor Invoice Reconciliation Maintenance
Voided Check Entry Each of these classes includes one or more additional options or components, where each option or component includes detailed information on functions that are available, as well as the way code will be generated for accessing and utilizing these options or components. For example, accounts payable user interface class 304 can allow a user to select an accounts payable check inquiry user interface class having predefined standards on how the options or components of the class can be used. Thus, coding standards can be defined for an accounts payable check inquiry class that produce code that generates a user interface and that adheres to a strict set of standards, so as to provide a framework that allows developer and site-specific layers of code to be provided that modify or add user interface functionality, and that further allows modifications or updates to the code to be compatible with such developer and site-specific layers.

In one exemplary embodiment, the following sequence of code development events can be supported to allow code to be easily modified for uses at different layers and to allow such modifications to be backwards-compatible with new releases of code at higher layers:

A primary code package can be prepared from an accounts payable user interface class that has an accounts payable check inquiry user interface, an accounts payable check number lookup user interface, and an accounts payable check run user interface.

After the code is generated and released as the primary code package, a developer for an enterprise may decide to add a general ledger distribution line item subpanel user interface and a general ledger distribution subpanel user interface, and to delete the accounts payable check run user interface.

After the code is generated and released as the developer code package, a second developer for a site-specific application may decide to add an invoice number lookup user interface, to delete the item subpanel user interface added by the first developer, and to reinstate the accounts payable check run user interface that was deleted by the first developer.

After the code is generated and released as the site specific code package, the primary code package can be modified to include an additional user interface, such as manual check entry, to delete a user interface, or to provide additional functionality to an existing user interface. The new primary code package can then be released, and will be compatible with the developer code package and site specific code package without subsequent modification.

As can be seen from this exemplary embodiment, the classes of system 300 can be added, deleted, or modified as needed at each layer, and any subsequent modifications to code at higher layers will be compatible with the existing additions, deletions or modifications that were previously made at lower layers.

Accounts receivable user interface class 306 includes one or more classes for generating accounts receivable user interfaces. In one exemplary embodiment, the following classes can be provided with accounts receivable user interface class 306:

---

Cash Receipts Charge Back Invoices
Cash Receipts Inquiry Batch Details
Cash Receipts Inquiry Customer Payment Details
Cash Receipts Inquiry
Cash Receipts Invoice Detail Header Subpanel
Cash Receipts Invoice Header Information Subpanel
Cash Receipts Misc Amounts
Cash Receipts
Customer Lookup Multiple Search Criteria
Manual Invoice Entry
Print Order Invoices Order List
Print Order Invoices

---

Each of these classes includes one or more additional options or components, where each option or component includes detailed information on functions that are available, as well as the way code will be generated for accessing and utilizing these options or components. For example, accounts receivable user interface class 306 can allow a user to select a cash receipts charge back invoices user interface class having predefined standards on how the options or components of the class can be used. Thus, coding standards can be defined for that class that produce code that generates a user interface and that adheres to a strict set of standards, so as to provide a framework that allows developer and site-specific layers of code to be provided that modify or add user interface functionality, and that further allows modifications or updates to the code to be compatible with such developer and site-specific layers.

General ledger user interface class 308 includes one or more classes for generating general ledger user interfaces. In one exemplary embodiment, the following classes can be provided with general ledger user interface class 308:

---

Analysis Code Maintenance Extra
Analysis Code Maintenance
Bank Code Lookup
Bank Maintenance
Close Period
Close Year
COA Maintenance
COA Maintenance Panel
Exchange Rate Maintenance
Exchange Rate Type Maintenance
Exchange Rate Type Mapping
External Bank Account Maintenance
Fiscal Calendar Beginning And Ending Date Subpanel
Fiscal Calendar Fiscal Year Subpanel
Fiscal Calendar Maintenance Line Item Subpanel
Fiscal Calendar Maintenance
Fiscal Calendar Radio Button Subpanel
Fiscal Period Lookup
Fiscal Period Maintenance Line Item Subpanel
Fiscal Period Maintenance
Fiscal Year Maintenance
General Ledger History Inquiry
GL Balance Inquiry
GL Map Definitions Panel
GL Mapping Maintenance
GL Mapping Panel
GL Posting Combination
GL Table Maintenance
Internal Bank Account Maintenance
Internal Bank Account Maintenance GL Subpanel
Journal Entry Line Items Subpanel
Journal Entry Lookup
Journal Entry
Revalue Currency

---

Each of these classes includes one or more additional options or components, where each option or component includes detailed information on functions that are available, as well as the way code will be generated for accessing and utilizing these options or components. For example, general ledger user interface class 308 can allow a user to select an analysis code maintenance user interface class having predefined standards on how the options or components of the class can be used. Thus, coding standards can be defined for that class that produce code that generates a user interface and that adheres to a strict set of standards, so as to provide a framework that allows developer and site-specific layers of code to be provided that modify or add user interface functionality, and that further allows modifications or updates to the code to be compatible with such developer and site-specific layers.

Global user interface class 310 includes one or more classes for generating user interface features having global applicability. In one exemplary embodiment, the following classes can be provided with global user interface class 310:

---

Business Partner Address Panel
Business Partner Info Panel
Business Partner Ledger Panel
Calendar Maintenance Panel
Client Policy Selection
Code File Maintenance
Code File Panel
Comments Subpanel
Company Maintenance Calendar Panel
Company Maintenance
Context Help
Criteria Subpanel
Currency Maintenance
Customer Maintenance -continued Customer Part Number Maintenance
Customer Search
Customer Ship To Maintenance
Customer Specific
Dialog Message
Format Subpanel
Freight Terms Fields
Key Word Maintenance
Locale Code Panel
Menu Help
Number Series Sub
Policy Selection
Product Search
Rebuild Key Words
Search Create Dialog
Ship To General Panel
Ship Via Fields
User Maintenance Defaults
User Maintenance Duties
User Maintenance Security
User Maintenance
User Message
Vendor Maintenance
Vendor Search
Vendor Ship From Maintenance
Workflow Inquiry
Workflow Unit Details Each of these classes includes one or more additional options or components, where each option or component includes detailed information on functions that are available, as well as the way code will be generated for accessing and utilizing these options or components. For example, global user interface class 310 can allow a user to select a business partner address panel user interface class having predefined standards on how the options or components of the class can be used. Thus, coding standards can be defined for that class that produce code that generates a user interface and that adheres to a strict set of standards, so as to provide a framework that allows developer and site-specific layers of code to be provided that modify or add user interface functionality, and that further allows modifications or updates to the code to be compatible with such developer and site-specific layers.

Inventory control user interface class 312 includes one or more classes for inventory control user interfaces. In one exemplary embodiment, the following classes can be provided with inventory control user interface class 312:

Backorder Allocation
Inventory Adjustment Line Items
Inventory Adjustment
Inventory Adjustment History Inquiry
Inventory Inquiry
Location Controlled Warehouse Maintenance
Location Entry Dialog
Location Entry Line Panel
Location Lookup
Lot Entry Dialog
Lot Entry Line Panel
Lot Location Entry Dialog
Lot Location Entry Line Panel
Lot Lookup
New Product Dialog
Physical Inventory Build List
Physical Inventory Display List
Physical Inventory Entry
Physical Inventory Print List
Physical Inventory Update
Pick Confirmation Entry Buttons -continued Pick Confirmation Entry Header
Pick Confirmation Entry Line Buttons
Pick Confirmation Entry Line List
Pick Confirmation Entry Line Main
Pick Confirmation Entry Line
Pick Confirmation Entry
Print Pick Tickets Maintenance
Product Lot Number Inquiry
Product Maintenance Cost Panel
Product Maintenance
Product References Accessories Subpanel
Product References Alternates Subpanel
Product References Keywords Subpanel
Product References Substitutes Subpanel
Product References UCC Subpanel
Product Serial Number Inquiry
Product Stock Location Inquiry
Product Warehouse Availability Inquiry
Putaway Document
Quantity Received Options
Receiver Number
Receiving Report
Reprint Pick Ticket WWU Selection
Serial Number Entry Dialog
Serial Number Entry Line Panel
Serial Number Location Entry Dialog
Serial Number Location Entry Line Panel
Serial Number Lookup
Ship Confirmation Entry Line
Ship Confirmation Entry
SR Entry Header
SR Entry
SR PO Entry Header Detail
SR PO Entry Header Main
SR PO Entry Header
SR PO Entry Line Header
SR PO Entry Line List
SR PO Entry Line Main
SR PO Entry Line Quantity
SR PO Entry Line
Stock Location Lookup
Stock Location Maintenance
Stock Location Movement Detail Sub
Stock Location Movement
Stock Location Product Inquiry
Stock Zone Maintenance
Transaction Audit Inquiry
Unit Category Associated UOM
Unit Category Maintenance
UOM Panel
Warehouse Panel
Warehouse Work Unit Lookup List
Warehouse Work Unit Lookup Each of these classes includes one or more additional options or components, where each option or component includes detailed information on functions that are available, as well as the way code will be generated for accessing and utilizing these options or components. For example, inventory control user interface class 312 can allow a user to select a backorder allocation user interface class having predefined standards on how the options or components of the class can be used. Thus, coding standards can be defined for that class that produce code that generates a user interface and that adheres to a strict set of standards, so as to provide a framework that allows developer and site-specific layers of code to be provided that modify or add user interface functionality, and that further allows modifications or updates to the code to be compatible with such developer and site-specific layers.

order common user interface class 314 includes one or more features for generating order common user interfaces. In one exemplary embodiment, the following classes can be provided with order common user interface class 314:

Freight Detail Entry
Freight Detail Tracking Entry
Freight Entry Dialog
Freight Entry Standalone
OC Entry Buttons
OC Entry Header Control
OC Entry Header Financial
OC Entry Header Import
OC Entry Header Miscellaneous
OC Entry Header Miscellaneous Warehouse
OC Entry Header Notes
OC Entry Header Primary
OC Entry Header Taxes
OC Entry Header User
OC Entry Line Buttons
OC Entry Line Control
OC Entry Line Costing
OC Entry Line Info
OC Entry Line Notes
OC Entry Line Product
OC Entry Line Purchasing
OC Entry Line Quantity Break
OC Entry Line User
OC Entry Line Vendor
OC Receive Options Panel
OC Receive Options
OC Tax Jurisdiction Entry Panel
Order Log Inquiry Document Lookup
Product Price Maintenance
Product Price Pricing Panel
Product Price Quantity Breaks Panel
Product Price
Shipping Warehouse Prompt
Tax Jurisdiction Lookup
Tax Jurisdiction Maintenance Each of these classes includes one or more additional options or components, where each option or component includes detailed information on functions that are available, as well as the way code will be generated for accessing and utilizing these options or components. For example, order common user interface class 314 can allow a user to select a freight detail entry user interface class having predefined standards on how the options or components of the class can be used. Thus, coding standards can be defined for that class that produce code that generates a user interface and that adheres to a strict set of standards, so as to provide a framework that allows developer and site-specific layers of code to be provided that modify or add user interface functionality, and that further allows modifications or updates to the code to be compatible with such developer and site-specific layers.

Purchase order user interface class 316 includes one or more features for generating purchase order user interfaces. In one exemplary embodiment, the following classes can be provided with purchase order user interface class 316:

Purchase Order Entry Header Detail
Purchase Order Entry Header Main
Purchase Order Entry Header
Purchase Order Entry Line Header
Purchase Order Entry Line List
Purchase Order Entry Line Main
Purchase Order Entry Line Quantity
Purchase Order Entry Line
Purchase Order Entry
Purchase Order Inquiry Line
Purchase Order Inquiry Lookup
Purchase Order Inquiry
Purchase Order Shipping Warehouse Prompt
Purchase Order Log Inquiry
Purchase Order Number Lookup
Purchase Order Print Each of these classes includes one or more additional options or components, where each option or component includes detailed information on functions that are available, as well as the way code will be generated for accessing and utilizing these options or components. For example, purchase order user interface class 316 can allow a user to select a purchase order entry header detail user interface class having predefined standards on how the options or components of the class can be used. Thus, coding standards can be defined for that class that produce code that generates a user interface and that adheres to a strict set of standards, so as to provide a framework that allows developer and site-specific layers of code to be provided that modify or add user interface functionality, and that further allows modifications or updates to the code to be compatible with such developer and site-specific layers.

Report user interface class 318 includes one or more features for generating report user interfaces. In one exemplary embodiment, the following classes can be provided with report user interface class 318:

Object Oriented SQL Report Option Dialog
Object Oriented SQL Report
Schedule Subpanel Each of these classes includes one or more additional options or components, where each option or component includes detailed information on functions that are available, as well as the way code will be generated for accessing and utilizing these options or components. For example, report user interface class 318 can allow a user to select an object oriented SQL database report option dialog user interface class having predefined standards on how the options or components of the class can be used. Thus, coding standards can be defined for that class that produce code that generates a user interface and that adheres to a strict set of standards, so as to provide a framework that allows developer and site-specific layers of code to be provided that modify or add user interface functionality, and that further allows modifications or updates to the code to be compatible with such developer and site-specific layers.

Shipping order user interface class 320 includes one or more features for generating accounts payable user interfaces. In one exemplary embodiment, the following classes can be provided with shipping order user interface class 320:

Customer Price Availability Customer Pricing Subpanel
Customer Price Availability Inquiry
Customer Price Availability Product Pricing Subpanel
Point Of Sale Customer Info
Point Of Sale Entry Header
Point Of Sale Entry Line
Point Of Sale Entry
Print Acknowledgements
Quotation Entry Buttons
Quotation Entry Header Detail Control
Quotation Entry Header Detail
Quotation Entry Header -continued Quotation Entry Line Detail Notes
    Quotation Entry Line Header Quantity
    Quotation Entry Line Header
    Quotation Entry Line Main
    Quotation Entry Line
    Quotation Entry Middle
    Quotation Entry
    Quotation Inquiry Line
    Quotation Inquiry Lookup
    Quotation Inquiry
    Quotation Log Inquiry
    Sales Order Entry Lookup
    Sales Order Log Inquiry
    Shipping Order Entry Buttons
    Shipping Order Entry Completion Panel
    Shipping Order Entry Header Detail Address
    Shipping Order Entry Header Detail Control
    Shipping Order Entry Header Detail Financial
    Shipping Order Entry Header Detail Notes
    Shipping Order Entry Header Detail Primary
    Shipping Order Entry Header Detail
    Shipping Order Entry Header Detail User
    Shipping Order Entry Header Main
    Shipping Order Entry Header
    Shipping Order Entry Line Accessories
    Shipping Order Entry Line Buttons
    Shipping Order Entry Line Detail Availability
    Shipping Order Entry Line Detail Control
    Shipping Order Entry Line Detail Customer
    Shipping Order Entry Line Detail Financial
    Shipping Order Entry Line Detail Notes
    Shipping Order Entry Line Detail Taxes
    Shipping Order Entry Line Detail User
    Shipping Order Entry Line Header Pricing
    Shipping Order Entry Line Header Product
    Shipping Order Entry Line Header Quantity
    Shipping Order Entry Line Header
    Shipping Order Entry Line List
    Shipping Order Entry Line Main
    Shipping Order Entry Line Substitutes
    Shipping Order Entry Line
    Shipping Order Entry Middle
    Shipping Order Entry Quick Lines
    Shipping Order Entry
    Shipping Order Inquiry Line List
    Shipping Order Inquiry Line
    Shipping Order Inquiry Lookup
    Shipping Order Inquiry
    Shipping Order Warehouse Prompt Each of these classes includes one or more additional options or components, where each option or component includes detailed information on functions that are available, as well as the way code will be generated for accessing and utilizing these options or components. For example, shipping order user interface class 320 can allow a user to select a customer price availability customer pricing subpanel user interface class having predefined standards on how the options or components of the class can be used. Thus, coding standards can be defined for that class that produce code that generates a user interface and that adheres to a strict set of standards, so as to provide a framework that allows developer and site-specific layers of code to be provided that modify or add user interface functionality, and that further allows modifications or updates to the code to be compatible with such developer and site-specific layers.

Utility user interface class 322 includes one or more classes for generating accounts payable user interfaces. In one exemplary embodiment, the following classes can be provided with utility user interface class 322:

Add Cancel Delete Dual Subpanel
    BT Addresses Panel
    BT Address Panel
    BT Debug
    BT Language
    BT Results Dialog
    BT Search Table
    Calendar Lookup
    Menu Maintenance
    OK Cancel Subpanel
    Reference Language Maintenance
    Security Group Maintenance Extra
    Security Group Maintenance
    Submit Suspend Button Subpanel Each of these classes includes one or more additional options or components, where each option or component includes detailed information on functions that are available, as well as the way code will be generated for accessing and utilizing these options or components. For example, utility user interface class 322 can allow a user to select a reference language maintenance user interface class having predefined standards on how the options or components of the class can be used. Thus, coding standards can be defined for that class that produce code that generates a user interface and that adheres to a strict set of standards, so as to provide a framework that allows developer and site-specific layers of code to be provided that modify or add user interface functionality, and that further allows modifications or updates to the code to be compatible with such developer and site-specific layers.

Ledger common user interface class 324 includes one or more classes for generating ledger common user interfaces, such as for accounts receivable and accounts payable. In one exemplary embodiment, the following classes can be provided with ledger common user interface class 324:

Aging Detail Inquiry
    Business Partner Invoice Number Lookup
    Invoice Inquiry
    Ledger Type Maintenance
    Payment Method Maintenance Extra
    Payment Method Maintenance
    Payment Terms Days Sub
    Payment Terms Detail Middle Sub
    Payment Terms Detail Sub
    Payment Terms Fixed Day Of Month Sub
    Payment Terms Installment Sub
    Payment Terms Maintenance
    Payment Terms Specific Date Sub Each of these classes includes one or more additional options or components, where each option or component includes detailed information on functions that are available, as well as the way code will be generated for accessing and utilizing these options or components. For example, ledger common user interface class 324 can allow a user to select a business partner invoice number lookup user interface class having predefined standards on how the options or components of the class can be used. Thus, coding standards can be defined for that class that produce code that generates a user interface and that adheres to a strict set of standards, so as to provide a framework that allows developer and site-specific layers of code to be provided that modify or add user interface functionality, and that further allows modifications or updates to the code to be compatible with such developer and site-specific layers.

Test user interface class 326 includes one or more classes for generating test user interfaces. In one exemplary embodiment, the following classes can be provided with test user interface class 326:

| Message Tester |
|---|
| Time Sheet |

Each of these classes includes one or more additional options or components, where each option or component includes detailed information on functions that are available, as well as the way code will be generated for accessing and utilizing these options or components. For example, test user interface class 326 can allow a user to select a message user interface class having predefined standards on how the options or components of the class can be used. Thus, coding standards can be defined for that class that produce code that generates a user interface and that adheres to a strict set of standards, so as to provide a framework that allows developer and site-specific layers of code to be provided that modify or add user interface functionality, and that further allows modifications or updates to the code to be compatible with such developer and site-specific layers.

Template user interface class 328 includes one or more classes for generating template user interfaces. In one exemplary embodiment, the following classes can be provided with template user interface class 328:

| Report Maintenance Field Subpanel |
|---|
| Report Maintenance |

Each of these classes includes one or more additional options or components, where each option or component includes detailed information on functions that are available, as well as the way code will be generated for accessing and utilizing these options or components. For example, test user interface class 328 can allow a user to select a report maintenance user interface class having predefined standards on how the options or components of the class can be used. Thus, coding standards can be defined for that class that produce code that generates a user interface and that adheres to a strict set of standards, so as to provide a framework that allows developer and site-specific layers of code to be provided that modify or add user interface functionality, and that further allows modifications or updates to the code to be compatible with such developer and site-specific layers.

Sales analysis user interface class 330 includes one or more classes for generating sales analysis user interfaces. In one exemplary embodiment, the following classes can be provided with sales analysis user interface class 330:

| Customer Product Inquiry |
|---|
| Product Sales History Inquiry |

Each of these classes includes one or more additional options or components, where each option or component includes detailed information on functions that are available, as well as the way code will be generated for accessing and utilizing these options or components. For example, sales analysis user interface class 330 can allow a user to select a customer product inquiry user interface class having predefined standards on how the options or components of the class can be used. Thus, coding standards can be defined for that class that produce code that generates a user interface and that adheres to a strict set of standards, so as to provide a framework that allows developer and site-specific layers of code to be provided that modify or add user interface functionality, and that further allows modifications or updates to the code to be compatible with such developer and site-specific layers.

In operation, system 300 allows a user interface to be configured using existing feature classes having predefined features and components. Each class of system 300 is implemented in a layered approach, so as to allow code to be generated in layers with backwards compatibility, such that when new versions of classes or code are available, such new versions will be compatible with any modifications implemented at the second, third, or other software layers.

Figure 4:
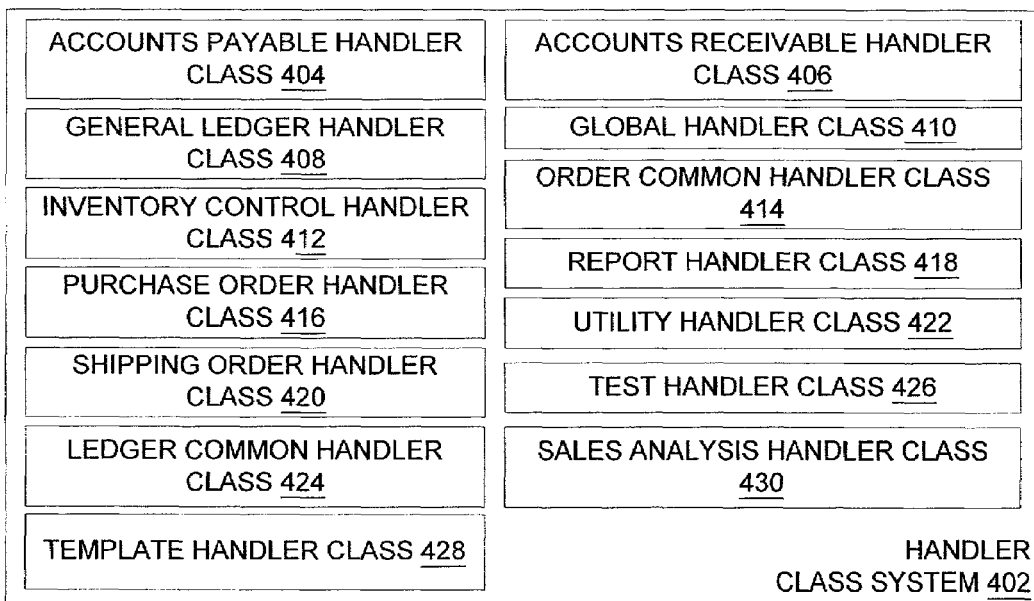
FIG. 4 is a diagram of a system for providing user interface states for corresponding user interface classes in accordance with an exemplary embodiment of the present invention.

FIG. 4 is a diagram of a system 400 for providing user interface states for corresponding user interface classes in accordance with an exemplary embodiment of the present invention. System 400 includes handler class system 402 and 14 exemplary handlers that provide user interface states as defined in greater detail herein.

Handler class system 402 provides predetermined user interface class states, where each state can be selected to provide the options and components of the user interface class in a user-selected order. In one exemplary embodiment, system 200 can be used to assemble a user interface for a program in conjunction with user interface class system 302 and handler class system 402. Additional handlers can be added to user interface class system 402, such that the new states will be backwards-compatible with any code generated at lower levels, such as at the developer code generator 106 level or site-specific code generator 108 level of system 100.

Accounts payable handler class 404 provides one or more states for an accounts payable user interface. In one exemplary embodiment, each of the accounts payable user interface classes provided with accounts payable user interface class 304 can include two or more states where a user, such as a developer, developer code generator, other code generator or other suitable user, can select which options or components are to be activated for a particular state. Accounts payable handler class 404 permits the navigation of the user interface through the selected states and can also indicate unallowed states or state progressions. For example, accounts payable handler class 404 allows a developer to select states for an accounts payable check inquiry user interface class, so as to permit a desired state progression based upon data entered or other actions taken by a user of the user interface generated by an accounts payable check inquiry user interface generated using accounts payable handler class 404.

In this exemplary embodiment, a primary code package can be prepared from an accounts payable user interface class that has an accounts payable check inquiry user interface progressing through 4 states. After the code is generated and released as the primary code package, a developer for an enterprise may decide to add a fifth state, and to delete a third state of the accounts payable user interface class. After the code is generated and released as the developer code package, a second developer for a site-specific application may decide to add a sixth state to the accounts payable user interface class, to delete the fifth state added by the first developer, and to reinstate the third state that was deleted by the first developer. After the code is generated and released as the site specific code package, the primary code package can be modified to include a seventh state after the fourth state, to delete one of the four states, or to modify one of the four existing states. The new primary code package can then be released, and will be compatible with the developer code package and site specific code package without subsequent modification.

Accounts receivable handler class 406 allows a user, such as a developer, developer code generator, other code generator or other suitable user, to select two or more states and the relationship between the selected states for an accounts receivable user interface. In one exemplary embodiment, system 200 can be used to assemble a user interface for a program in conjunction with user interface class system 302 and handler class system 402. Additional handlers can be added to user interface class system 402, such that the new states will be backwards-compatible with any code generated at lower levels, such as at the developer code generator 106 level or site-specific code generator 108 level of system 100.

In a similar manner, if a state change is appropriate, general ledger handler class 408 allows a user to select two or more states for a general ledger user interface class 308; global handler class 410 allows a user to select two or more states for a global user interface class 310; inventory control handler class 412 allows a user to select two or more states for an inventory control user interface class 312; order common handler class 414 allows a user to select two or more states for an order common user interface class 314; purchase order handler class 416 allows a user to select two or more states for a purchase order user interface class 316; report handler class 418 allows a user to select two or more states for a report user interface class 318; shipping order handler class 420 allows a user to select two or more states for a shipping order user interface class 320; utility handler class 422 allows a user to select two or more states for a utility user interface class 322; ledger common handler class 424 allows a user to select two or more states for a ledger common user interface class 324; test handler class 426 allows a user to select two or more states for a test user interface class 326; template handler class 428 allows a user to select two or more states for a template user interface class 328; and sales analysis handler class 430 allows a user to select two or more states for a sales analysis user interface class 330.

In operation, system 400 allows states to be provided for user interface features, so as to allow the user of the system (i.e., the developer) to migrate and modify code without requiring the user to provide the programming code that will generate the desired states or reintegrate that code. Code generated by system 400 is implemented in a layered approach, so as to allow code to be generated in layers with backwards compatibility, such that when new releases of classes or code are available that provide new or modified states, such new versions will be compatible with any states implemented at the second, third, or other software layers.

Figure 5:
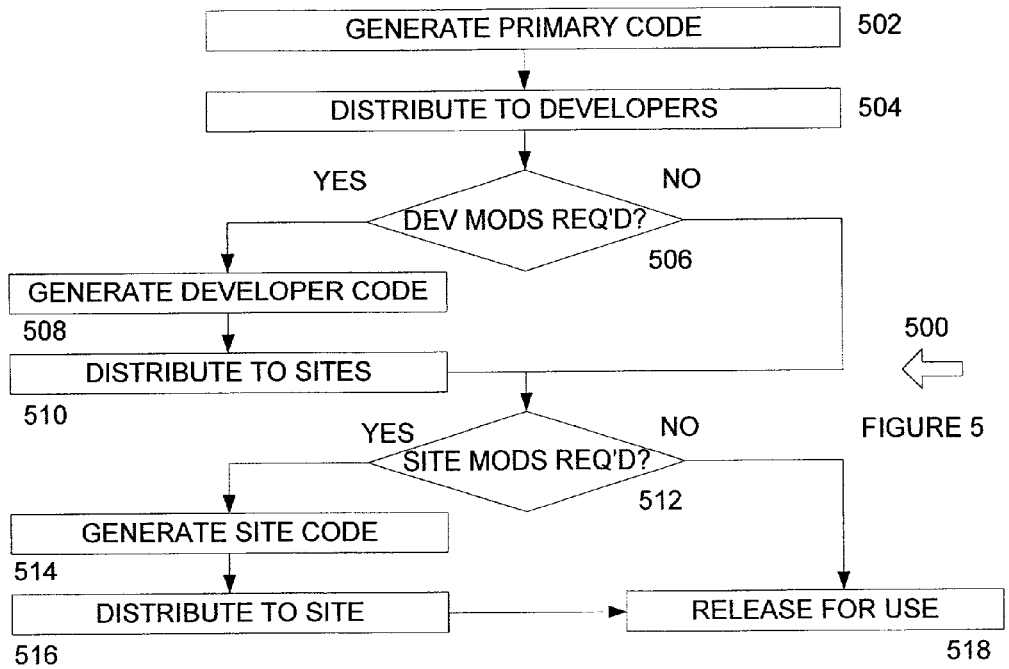
FIG. 5 is a flowchart of a method for generating code in multiple layers in accordance with an exemplary embodiment of the present invention.

FIG. 5 is a flowchart of a method 500 for generating code in multiple layers in accordance with an exemplary embodiment of the present invention. Method 500 allows code to be generated in layers, such as for supporting enterprise and site-specific modifications, and further allows modifications to higher layers of code to be implemented that are backwards compatible with lower layers of code modifications.

Method 500 begins at 502 where primary code is generated. In one exemplary embodiment, primary code can be generated from a user interface component package that includes a plurality of user interface classes, options and components for each class, associated states, or other suitable features. The coordination of the options, components, states and other desired functionality can be provided, and code can be generated based on the predetermined components. The method then proceeds to 504.

At 504, the generated primary code is distributed to developers. In one exemplary embodiment, the developers can receive a software application designed for a certain purpose, such as inventory control, accounts receivable, general ledger processing, a suite of software applications, or other suitable code, and can then modify the code to make accommodations for enterprise requirements, developer's preferences, or other suitable changes. The method then proceeds to 506.

At 506, it is determined whether developer modification is required, such as to provide additional features or modification of features that may be required in a predetermined application. If it is determined at 506 that no developer modifications are required, the method proceeds to 512. Otherwise, the method proceeds to 508 where developer code is generated. In one exemplary embodiment, a component toolkit can be used, such as a user interface component toolkit having user interface features and associated state engines for each feature. Likewise, the developer code can be generated by first displaying the primary code, such as using a primary code editor that identifies components, options, access and utilization, states, or other suitable data, and that further allows a user to modify the primary code, add new features, components, options, or states, modify existing features, components, options, or states, or otherwise change the functionality of the primary code. The modified primary code module can then be tested in conjunction with the primary code, and the method proceeds to 510.

At 510, the modified primary code is provided to sites in conjunction with the primary code. If it is determined at 512 that site-specific modifications are required, the method proceeds to 514 where the primary code and developer code modifications are displayed, and site-specific code modifications are performed, such as by adding new features, components, options, or states, modifying existing features, components, options, or states, or otherwise changing the functionality of the primary code. The method then proceeds to 518 where the code is released for use.

In operation, method 500 allows code to be generated for one or more components and distributed in layers such that modifications or additions to the code can be provided using an existing classification paradigm. The code generated with method 500 can further be backwards compatible, such that changes to primary code can be implemented without requiring changes to previously developed modifications applied at one or more layers to earlier releases of the code.

Figure 6:
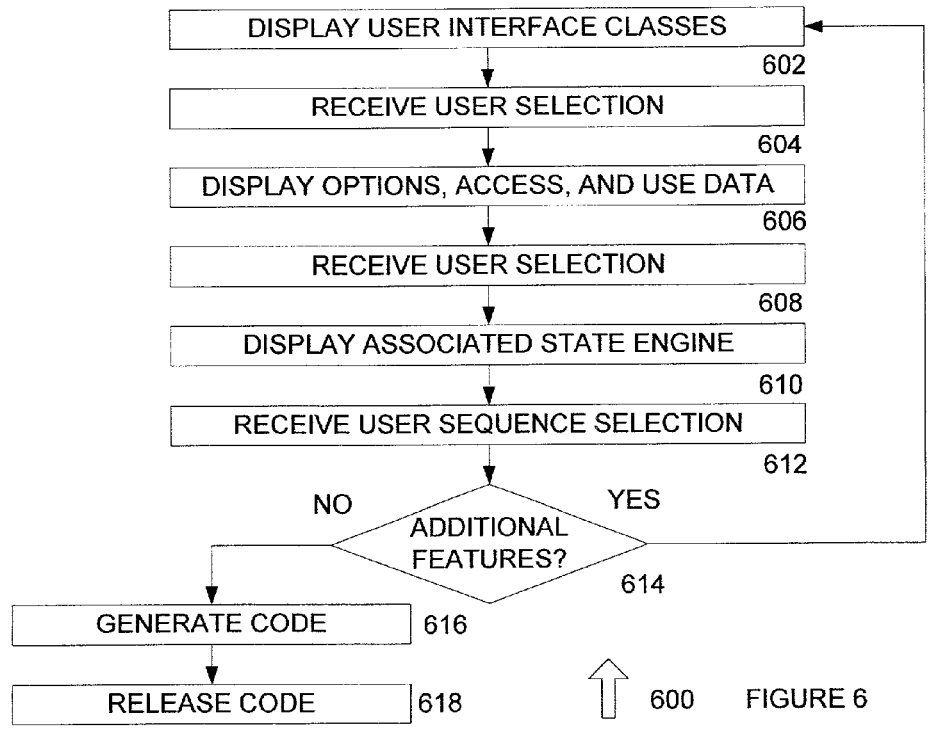
FIG. 6 is a flowchart of a method for generating primary code in accordance with an exemplary embodiment of the present invention.

FIG. 6 is a flowchart of a method 600 for generating primary code in accordance with an exemplary embodiment of the present invention. Method 600 allows a user to generate primary code, such as user interface code, using predefined features and associated state engine functionality for the features.

Method 600 begins at 602 where user interface classes are displayed. The user interface classes can include one or more predetermined sets of classes having user interface features and associated options and components, such as to facilitate the generation of code that creates user interfaces. In one exemplary embodiment, the user interface classes are displayed in a code generator system or other suitable code generator. The method then proceeds to 604. At 604, a user selection is received. The user can include a developer, a developer code generator, other code generator or other suitable user. The user selection can be a selection of one of the user interface classes, user interface class options or components, or other suitable user selections. The method proceeds to 606.

At 606, the coding standards for code that will be generated to access and use the feature, option, component, or other user selection is displayed. In one exemplary embodiment, the coding standards can include the available functions for the selected feature, option, component or other user selection, associated access and use data such as pseudo code or other suitable data showing how code implementing the feature, option, component or other user selection will be generated, and other suitable data. The method then proceeds to 608.

At 608, user selections of the options, access, and use data are received. In one exemplary embodiment, additional debugging other suitable processes can be performed, so that the user can verify that the selection provides the desired functionality. The method then proceeds to 610.

At 610, an associated state engine for the feature is displayed. In one exemplary embodiment, state engine can include a set of components and user-selectable controls that allow the user to select components that are to be activated for each particular state. The method then proceeds to 612.

At 612, the user sequence selection is received, such as one or more selections of components that are to be activated for a particular state. The method then proceeds to 614.

At 614, it is determined whether additional features are desired. In one exemplary embodiment, additional features can be added by selecting from a menu, clicking and dragging the feature into a work area, or other suitable functions. If additional features are required, the method returns to 602. Otherwise, the method proceeds to 616 where code is generated to generate the user interface designed or selected by the user. In one exemplary embodiment, the code generation can also include debugging and testing, so that the user can verify that the code generates the user interface having the features selected by the user. The method then proceeds to 618 where the code is released for use.

In operation, method 600 allows a user to select one or more user interface features from a component work set, and to configure the component features and the states associated with the component feature for use in a user interface. Method 600 allows code to be generated that will generate the desired user interface having the desired features and states.

Figure 7:
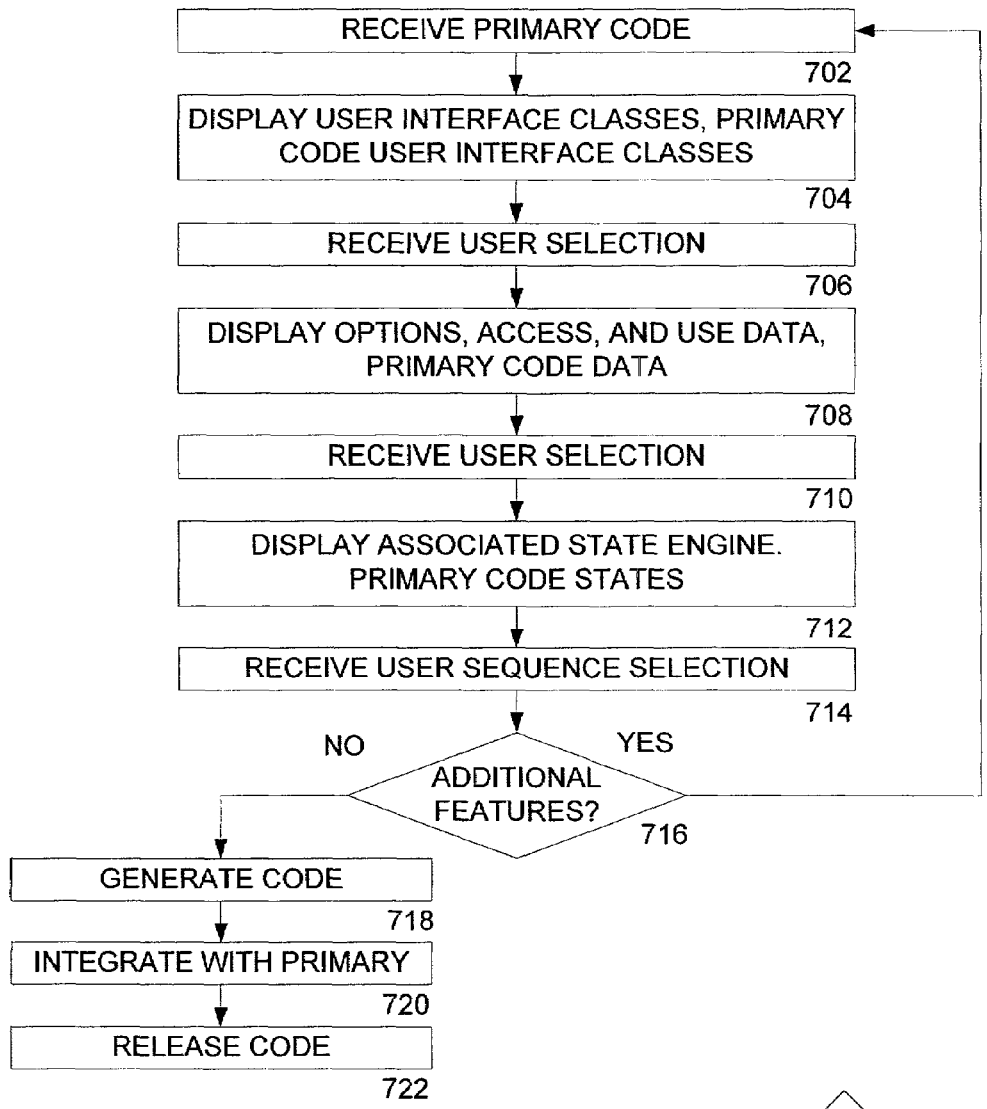
FIG. 7 is a flowchart of a method for adding a layer of code to previously generated code in accordance with an exemplary embodiment of the present invention.

FIG. 7 is a flowchart of a method 700 for adding a layer of code to previously generated code in accordance with an exemplary embodiment of the present invention. Method 700 allows a user to modify user interface code or other suitable code at a subsequent layer, and further allows the code added at the subsequent layers to be backwards compatible with any code revisions to the primary code or code from a higher layer.

Method 700 begins at 702 where primary code is received. In one exemplary embodiment, the primary code can be a first set of code generated by a user at the highest level of a code architecture. Likewise, the primary code can include one or more additional layers of code, such as those generated by a developer for an enterprise, a consultant, or other suitable intermediaries. The method then proceeds to 704.

At 704, user interface classes are displayed independently or in conjunction with primary code user interface classes. In one exemplary embodiment, the user interface classes can be displayed as selected by a user, and any modifications required to superimpose the selected user interface classes on the primary code can be performed without subsequent operator interaction. Likewise, the primary code user interfaces can be generated and supplemental user interface classes can be displayed, such that the operator can add features, select features to be deleted or modified, or perform other suitable functions.

In another exemplary embodiment, when a primary code change has been implemented, the user interface classes can be displayed with the current primary code classes, with indications of changes between the previous primary code and the new version of the primary code, or in other suitable manners. The method then proceeds to 706.

At 706, a user selection is received, such as selection of a new feature to add to the user interface, selection of an existing primary feature to modify, or other suitable user selections. The method then proceeds to 708.

At 708, the options and information on accessing and using the features in the primary code data and/or the primary code data can be displayed. In one exemplary embodiment, primary code data features can be modified, and the user can select to have the options, access, and use data displayed for the primary code data. Likewise, additional features can be added, and the options, access, and use data can be provided so as to allow those features to interact with the existing primary code. Likewise, when primary code versions have been modified, the existing layer of code options, access, and use data can be displayed with the new primary code data, with primary code data showing the difference between old primary code data and new primary code data, or other suitable data. The method then proceeds to 710.

At 710, user selections are received. The user selections can include options, access, and use data to be modified in primary code data, additional options, access, and use data to be implemented in conjunction with the primary code data, or other suitable user selections. The method then proceeds to 712.

At 712, the associated state engine and primary code states are displayed. In one exemplary embodiment, a user can elect to modify only the state engine aspects of the primary code. Likewise, state engine capability for user-selected additional features can be displayed at 712. The method then proceeds to 714.

At 714, a user sequence selection is received. In one exemplary embodiment, the user can select a sequence of states from the associated state engine. Likewise, the user can re-sequence the states provided for the primary code, or can perform other suitable functions. The method then proceeds to 716.

At 716, it is determined whether additional features are desired. If additional features are desired, the method returns to 702. Otherwise, the method proceeds to 718.

At 718, code is generated. The code can include supplemental code layers that are used in conjunction with a set of primary code, a new set of code that includes both the functionality provided by the primary code and new code functionality, or other suitable code. The method then proceeds to 720.

If the code generated at 718 includes only additional code functionality at the second or subsequent layers, then the newly generated code can be integrated with the primary code at 720. The method then proceeds to 722.

At 722, the code is released for use. In one exemplary embodiment, additional testing and bug fixing can be performed prior to releasing the code for use.

In operation, method 700 allows layers of code to be generated such that when additional functionality or features are desired at the organizational or site level, these features can be added in a manner that allows modifications to be made to the primary code without requiring the features to be re-implemented at a later stage.

Although exemplary embodiments of a system and method for performing the present invention have been described in detail herein, those skilled in the art will also recognize that various substitutions and modifications can be made to the systems and methods without departing from the scope and spirit of the appended claims.

What is claimed is:

1. A system for generating user interface code comprising:
   a user interface class system generating user interface class code, wherein the user interface class code includes two or more user interface features that can be selected and assembled into a user interface by a user; and
   a handler class system generating handler class code, wherein the handler class code includes one or more states for each user interface feature of the user interface class;
   wherein the user interface class and the handler class cause the selected user interface features and associated states for the user interface features to be automatically generated when the user interface code is executed, and
   wherein the user interface class includes an accounts payable user interface class, an accounts receivable user interface class, a general ledger user interface class, a global user interface class, an inventory control user interface class, an order common user interface class, a purchase order user interface class, a report user interface class, a shipping order user interface class, a utility user interface class, a report user interface class, a test user interface class, and a template user interface class.

2. The system of claim 1 wherein the user interface class system further comprises a developer user interface class system automatically generating a developer user interface class that operates in conjunction with the user interface code to provide modified user interface features.

3. The system of claim 2 wherein the user interface class system further comprises a site-specific user interface class system generating a site-specific user interface class that operates in conjunction with the user interface code and the developer user interface class to provide site-specific user interface features.

4. The system of claim 1 further comprising a developer handler class system generating a developer handler class that operates in conjunction with the user interface code to automatically provide modified user interface states.

5. The system of claim 4 wherein the developer handler class system further comprises a site-specific handler class system generating a site-specific handler class that operates in conjunction with the user interface code and the developer handler class to provide site-specific user interface states.

6. A system for generating user interface code comprising:
   a user interface class system generating user interface class code, wherein the user interface class code includes two or more user interface features that can be selected and assembled into a user interface by a user; and
   a handler class system generating handler class code, wherein the handler class code includes one or more states for each user interface feature of the user interface class;
   wherein the user interface class and the handler class cause the selected user interface features and associated states for the user interface features to be automatically generated when the user interface code is executed, and
   wherein the handler class includes an accounts payable handler class, an accounts receivable handler class, a general ledger handler class, a global handler class, an inventory control handler class, an order common handler class, a purchase order handler class, a report handler class, a shipping order handler class, a utility handler class, a report handler class, a test handler class, and a template handler class.

7. The system of claim 6 wherein the user interface class system further comprises a developer user interface class system automatically generating a developer user interface class that operates in conjunction with the user interface code to provide modified user interface features.

8. The system of claim 7 wherein the user interface class system further comprises a site-specific user interface class system generating a site-specific user interface class that operates in conjunction with the user interface code and the developer user interface class to provide site-specific user interface features.

9. The system of claim 6 further comprising a developer handler class system generating a developer handler class that operates in conjunction with the user interface code to automatically provide modified user interface states.

10. The system of claim 9 wherein the developer handler class system further comprises a site-specific handler class system generating a site-specific handler class that operates in conjunction with the user interface code and the developer handler class to provide site-specific user interface states.

11. A method for generating user interface code comprising:
    receiving a selection of user interface feature for a user interface class;
    automatically retrieving a handler associated with the user interface feature that includes one or more states;
    automatically generating one or more code elements that cause a user display to be generated when executed that includes the user interface feature having the one or more states; and
    wherein receiving a selection of the user interface feature from the user interface class includes receiving a selection from an account payable user interface class, an accounts receivable user interface class, a general ledger user interface class, a global user interface class, an inventory control user interface class, an order common user interface class, a purchase order user interface class, a report user interface class, a shipping order user interface class, a utility user interface class, a report user interface class, a test user interface class, and a template user interface class.

12. The method of claim 11 further comprising:
    receiving a selection of a developer user interface feature from a developer user interface class; and
    automatically generating one or more code elements that cause the user display to be generated that includes the developer user interface feature.

13. The method of claim 12 further comprising:
    receiving a selection of a site-specific user interface feature from a site-specific user interface class; and
    automatically generating one or more code elements that cause the user display to be generated that includes the site-specific user interface feature.

14. The method of claim 11 further comprising:
receiving a selection of a developer user interface state from a developer handler class; and
automatically generating one or more code elements that cause the user display to be generated that includes the developer user interface state.

15. The method of claim 11 further comprising:
receiving a selection of site-specific user interface state from a site-specific handler class; and
automatically generating one or more code elements that cause the user display to be generated that includes the site-specific user interface state.

16. A method for generating user interface code comprising:
receiving a selection of user interface feature for a user interface class;
automatically retrieving a handler associated with the user interface feature that includes one or more states;
automatically generating one or more code elements that cause a user display to be generated when executed that includes the user interface feature having the one or more states; and
wherein retrieving the handler associated with the user interface feature that includes one or more states includes retrieving an accounts payable handler class, an accounts receivable handler class, a general ledger handler class, a global handler class, an inventory control handler class, an order common handler class, a purchase order handler class, a report handler class, a shipping order handler class, a utility handler class, a report handler class, a test handler class, and a template handler class.

17. The method of claim 16 further comprising:
receiving a selection of a developer user interface feature from a developer user interface class; and
automatically generating one or more code elements that cause the user display to be generated that includes the developer user interface feature.

18. The method of claim 17 further comprising:
receiving a selection of a site-specific user interface feature from a site-specific user interface class; and
automatically generating one or more code elements that cause the user display to be generated that includes the site-specific user interface feature.

19. The method of claim 16 further comprising:
receiving a selection of a developer user interface state from a developer handler class; and
automatically generating one or more code elements that cause the user display to be generated that includes the developer user interface state.

20. The method of claim 16 further comprising:
receiving a selection of site-specific user interface state from a site-specific handler class; and
automatically generating one or more code elements that cause the user display to be generated that includes the site-specific user interface state.

* * * * *